(12) United States Patent
Jung et al.

(10) Patent No.: US 7,904,575 B2
(45) Date of Patent: Mar. 8, 2011

(54) APPARATUS AND METHOD FOR MATCHING PROTOCOLS OF EMBEDDED AUDIO/VIDEO CONTENTS

(75) Inventors: Dong-shin Jung, Suwon-si (KR); Joo-yeol Lee, Seoul (KR); Seung-jae Oh, Seoul (KR); Se-hee Han, Seoul (KR); Won-seok Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 863 days.

(21) Appl. No.: 11/828,063

(22) Filed: Jul. 25, 2007

(65) Prior Publication Data

US 2008/0052347 A1  Feb. 28, 2008

Related U.S. Application Data

(60) Provisional application No. 60/840,043, filed on Aug. 25, 2006.

(30) Foreign Application Priority Data

Jan. 9, 2007 (KR) .......................... 10-2007-0002582

(51) Int. Cl.
  *G06F 15/16* (2006.01)
  *G06F 15/177* (2006.01)
(52) U.S. Cl. ........................................ 709/230; 709/220
(58) Field of Classification Search .................. 709/220, 709/223, 231, 230
See application file for complete search history.

(56) References Cited

U.S. PATENT DOCUMENTS

| | | | | |
|---|---|---|---|---|
| 6,895,433 | B1 * | 5/2005 | Slater et al. | 709/220 |
| 7,069,332 | B2 * | 6/2006 | Shibata et al. | 709/231 |
| 7,155,728 | B1 * | 12/2006 | Prabhu et al. | 719/316 |
| 7,467,221 | B2 * | 12/2008 | Shibata et al. | 709/231 |
| 7,523,214 | B2 * | 4/2009 | Kikkawa et al. | 709/231 |
| 7,555,543 | B2 * | 6/2009 | Encarnacion et al. | 709/223 |
| 7,653,735 | B2 * | 1/2010 | Mandato et al. | 709/231 |
| 7,668,939 | B2 * | 2/2010 | Encarnacion et al. | 709/220 |
| 2003/0037139 | A1 | 2/2003 | Shteyn | |
| 2004/0158823 | A1 * | 8/2004 | Saint-Hilaire et al. | 717/140 |
| 2004/0205218 | A1 * | 10/2004 | Nakaoka et al. | 709/231 |
| 2005/0108766 | A1 * | 5/2005 | Hlasny et al. | 725/100 |
| 2006/0094360 | A1 * | 5/2006 | Jung et al. | 455/41.2 |

FOREIGN PATENT DOCUMENTS

KR  10-2004-0091213 A  10/2004
WO  WO 2005/036827 A1  4/2005

* cited by examiner

Primary Examiner — Krisna Lim
(74) Attorney, Agent, or Firm — Sughrue Mion, PLLC

(57) ABSTRACT

The present invention provides an apparatus and method for matching protocols of embedded audio/video (AV) contents. The apparatus includes a remote user interface (RUI) server which receives uniform resource identifier (URI) information of AV contents embedded in user interface (UI) data and protocol information of the AV contents; an RUI client which receives the UI data, which was created using the URI information and the protocol information, from the RUI server; and an AV control point (CP) which receives the protocol information and a control request command for the AV contents from the RUI client, matches protocol information obtained from a media renderer with the protocol information received from the RUI client, and performs a control operation on the AV contents.

20 Claims, 7 Drawing Sheets

APPARATUS AND METHOD FOR MATCHING PROTOCOLS OF EMBEDDED AUDIO/VIDEO CONTENTS

CROSS REFERENCE TO RELATED APPLICATIONS

This application claims priority from Korean Patent Application No. 10-2007-0002582 filed on Jan. 9, 2007 in the Korean Intellectual Property Office, and U.S. Provisional Patent Application No. 60/840,043 filed on Aug. 25, 2006 in the United States Patent and Trademark Office, the disclosures of which are incorporated herein by reference in their entirety.

BACKGROUND OF THE INVENTION

1. Field of the Invention

Methods and apparatuses consistent with the present invention relate to a remote user interface (RUI) technology on a home network, and more particularly, to matching protocols of embedded audio/video (AV) contents, and enabling RUI devices to simultaneously perform a protocol matching process for AV contents embedded in user interface (UI) data and a profile matching process.

2. Description of the Related Art

When AV contents embedded in UI data are reproduced, a protocol matching process for the AV contents is additionally required between conventional RUIs. The AV contents may be video, audio, and image tags included in hypertext markup language (HTML) pages.

FIG. 1 illustrates a related art structure of UI data transmitted to an RUI client. The UI data 10 includes various forms of objects. Embedded AV contents 20 are a form of the objects. The embedded AV contents 20 may be divided into AV contents uniform resource identifier (URI) 21, which is location information required to retrieve AV contents, and universal plug and play (UPnP) AV control point (CP) module 22 which performs UPnP-based AV control. The UI data 10 receives a control command from a user and processes the control command. The control command may be for reproducing the AV contents or stopping the reproduction of the AV contents. A major example of the UI data 10 may be a web page displayed using a web browser on the Internet.

The AV contents 20 embedded in the UI data 10 in the form of an object tag may be included in UI data used for extensible hypertext markup language (XHTML)-based RUI related standards, such as Consumer Electronics Association (CEA)-2014. The object tag may include 'param' elements, and additional information of AV contents corresponding to an object may be provided using these elements.

RUI devices include an RUI server and an RUI client. A device description of the RUI server includes a <rui:uiServerInfo> tag which is information regarding the RUI server. A uniform resource locator (URL) described in <rui:uiListURL> of the <rui:uiServerInfo> tag indicates an extensible markup language (XML) file, and profile matching is performed based on profiles included in the XML file. In this case, <rui:uiListURL> may include information on ui_profile name, audio_profile name, and video_profile name.

Similarly, a device description of the RUI client includes a <rui:uiClientInfo> tag which is information regarding the RUI client. The <rui:uiClientInfo> tag may have one or more profile lists, and each profile list may include profile name, aspect ratio, and transport.

FIG. 2 illustrates a related art profile matching process between RUI devices. An RUI CP 50 performs discovery and control operations on an RUI client 40 and an RUI server 60 (operation S11). The RUI client 40 identifies a ui profile that can be provided to the RUI server 60, and determines whether the ui profile is included in a profile list of the RUI server 60. That is, the RUI client 40 performs a UI profile matching process (operation S12). If the profile matching process is completed, UI data is transmitted from the RUI server 60 to the RUI client 40 (operation S13). Accordingly, the RUI server 60 receives a request from the RUI client 40 to process an event, processes the event, and notifies the RUI client 40 of the result of event processing (operation S14). A control command for reproducing AV contents included in the UI data or stopping the reproduction of the AV contents is executed, when a protocol matching process for the AV contents, which will be described later, is performed.

FIG. 3 illustrates a related art process of matching protocols of AV contents between RUI devices.

After the profile matching process in FIG. 2 is completed, an RUI server 60 obtains URI information used to access AV contents from a media server 30 before creating UI data 10 (operation S21). The method of obtaining the URI information may vary according to how the media server 30 and the RUI server 60 are implemented. An example of the URI information may be "http://server.com/av.mpg". The UI data 10 includes the AV contents having the URI information and is transmitted from the RUI server 60 to an RUI client 40 (operation S22). Then, the RUI client 40 provides the UI data 10 to a user through a rendering process. The user inputs a control command to the RUI client 40 in order to request an AV CP 50 to control the AV contents (operation S23). At the request of the user, the AV CP 50 included in a media renderer starts AV contents control. Although the media renderer and the AV CP 50 are not the same devices, they may be implemented as a single device as illustrated in FIG. 3. Alternatively, they may be implemented as separate devices.

When starting the AV contents control, the AV CP 50 requests the media server 30 to provide protocol information (operation S24). In response to the request, the media server 30 provides the protocol information to the AV CP 50 (operation S25). The AV CP 50 extracts protocol information from the media renderer (operation S26), and matches the extracted protocol information with the protocol information provided by the media server 30 (operation S27). If this protocol matching process is completed, the AV CP 50 retrieves the AV contents from the media server 30 using the URI information of the AV contents included in the UI data 10 (operation S28), thereby performing the AV contents control desired by the user.

However, according to the above related art method, the RUI devices must separately perform a profile matching process to transmit UI data and perform a protocol matching process for AV contents included in the UI data. Therefore, if n pieces of AV contents are included in the UI data, the process of extracting protocol information must be performed a maximum of n times for each piece of AV contents through a network. Consequently, the speed of controlling the AV contents may be reduced, and network traffic may be severely increased.

SUMMARY OF THE INVENTION

The present invention provides an apparatus and method for matching protocols of embedded AV contents, the apparatus and method capable of improving a related art method of separately performing a protocol matching process, in which it is determined whether AV contents included in UI data can be controlled, and a UI profile matching process, simultaneously performing the UI profile matching process and the protocol matching process for the AV contents, thereby omitting an additional process of extracting protocol information when the AV contents are actually controlled, and enhancing the efficiency of the protocol matching process for the AV contents.

According to an aspect of the present invention, there is provided an apparatus for matching protocols of embedded AV contents. The apparatus includes an RUI server which receives URI information of AV contents embedded in UI data and protocol information of the AV contents; an RUI client which receives the UI data, which was created using the URI information and the protocol information, from the RUI server; and an AV CP which receives the protocol information and a control request command for the AV contents from the RUI client, matches protocol information obtained from a media renderer with the protocol information received from the RUI client, and performs a control operation on the AV contents.

According to another aspect of the present invention, there is provided a method of matching protocols of embedded AV contents. The method includes receiving URI information of AV contents embedded in UI data and protocol information of the AV contents using an RUI server; transmitting the UI data, which was created using the URI information and the protocol information, from the RUI server to an RUI client; and parsing the URI information and the protocol information of the AV contents embedded in the UI data, and storing the URI information and the protocol information using the RUI client.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
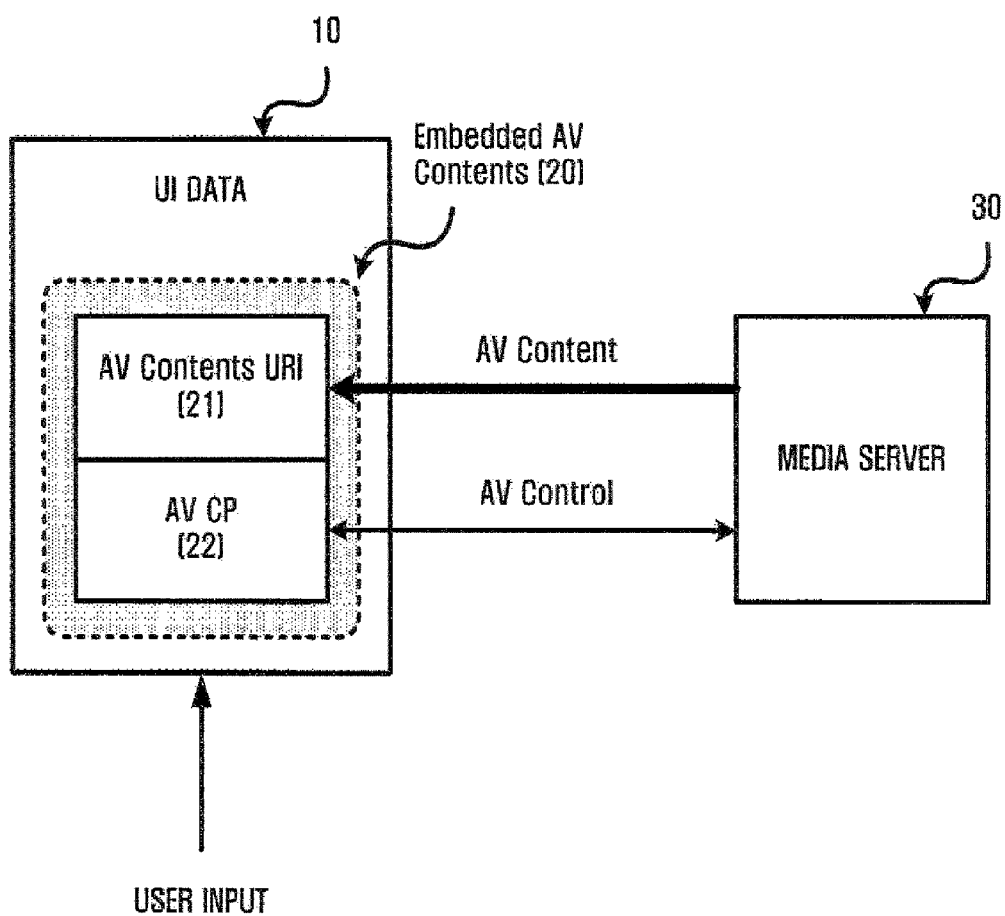
FIG. 1 illustrates a related art structure of UI data transmitted to an RUI client.

The present invention will now be described more fully with reference to the accompanying drawings, in which exemplary embodiments of the present invention are shown. The present invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Like reference numerals in the drawings denote like elements, and thus their description will be omitted.

An apparatus and method for matching protocols of embedded AV contents according to exemplary embodiments of the present invention will hereinafter be described in detail with reference to the accompanying drawings.

For convenience, a UPnP RUI system, which is an application of UPnP, will mainly be described in the exemplary embodiments of the present invention. In addition, devices for implementing the present invention will be named after devices defined in UPnP RUI specifications. However, it is obvious to those of ordinary skill in the art that the scope of the present invention will not be affected by the home network system and the names of the devices.

Figure 4:
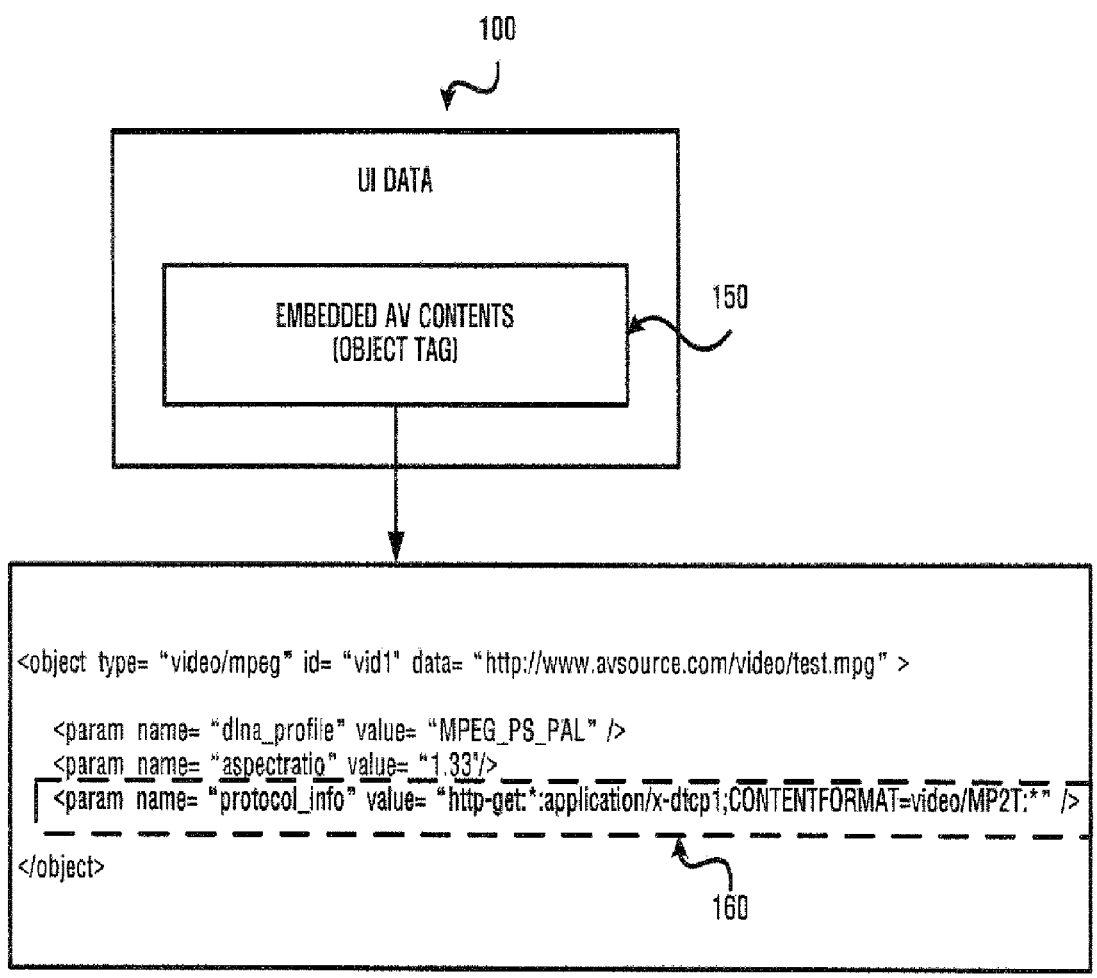
FIG. 4 illustrates a configuration of embedded AV contents which include protocol information according to an exemplary embodiment of the present invention.

FIG. 4 illustrates a configuration of embedded AV contents which include protocol information according to an exemplary embodiment of the present invention. Referring to FIG. 4, UI data 100 has embedded AV contents 150, and an element of an object tag that forms the embedded AV contents 150 additionally defines protocol information 160 defined in UPnP AV specifications. Therefore, exemplary embodiments of the present invention, which will be described later, can be applied without modifying the UPnP AV specifications.

Figure 5:
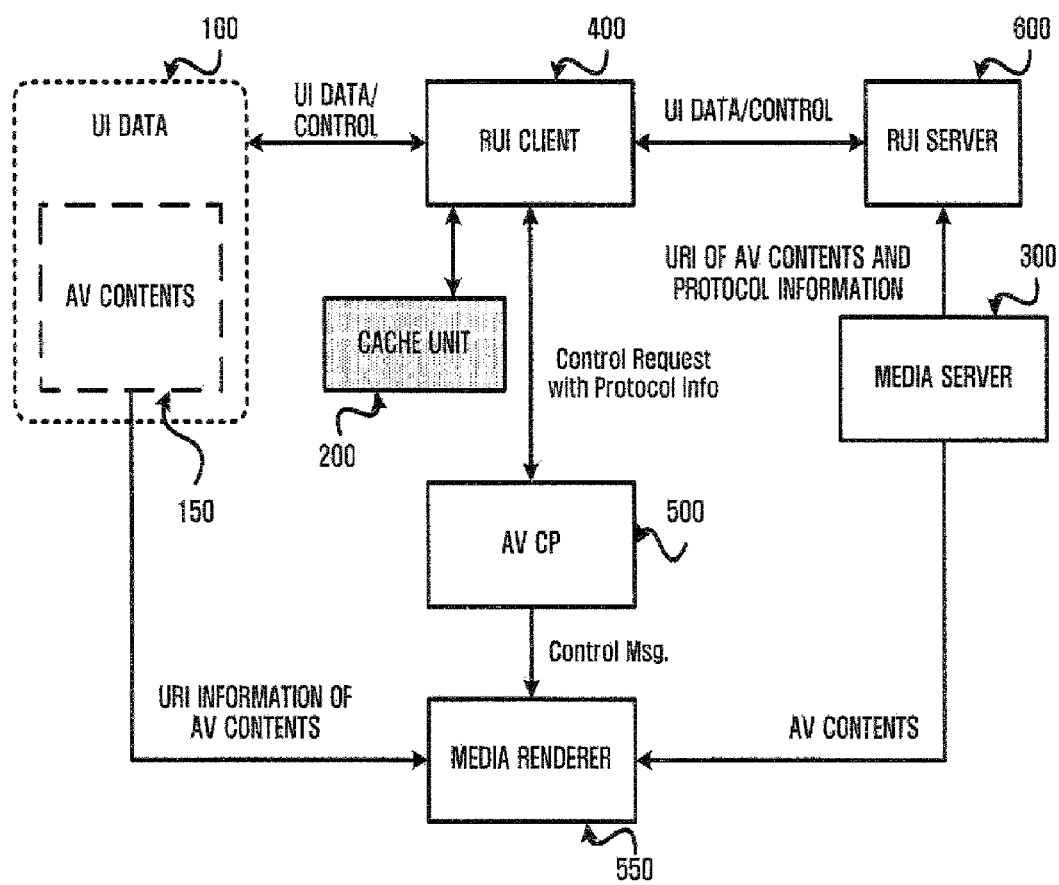
FIG. 5 illustrates a configuration of an apparatus for matching protocols of embedded AV contents according to an exemplary embodiment of the present invention.

FIG. 5 illustrates a configuration of an apparatus for matching protocols of embedded AV contents according to an exemplary embodiment of the present invention. Referring to FIG. 5, the apparatus includes an RUI client 400 connected to a cache unit 200, an RUI server 600, a media server 300, an AV CP 500, and a media renderer 550.

The RUI server 600 receives URI information of AV contents 150 embedded in UI data 100 and protocol information of the AV contents 150 from the separate media server 300 that stores AV contents. The RUI server 600 is one of controlled devices defined in the UPnP AV specifications. Like a desktop personal computer (PC) or a notebook PC, the RUI server 600 can generate a UI event and store UI data. A protocol of the AV contents 150 is a rule used by the RUI client 400 to output the UI data 100 of the RUI server 600. Examples of the protocol may include remote desktop protocol (RDP), hypertext transfer protocol (HTTP), and expandable home theater (XHT). The RUI server 600 and the media server 300 may be implemented as a single device or as separate devices.

The RUI client 400 receives the UI data 100 from the RUI server 600. The UI data 100 may be created using the URI information and the protocol information. The RUI client 400 is another controlled device defined in the UPnP AV specifications. The RUI client 400 may be a PC located at a different place and thus remotely controlled by a desktop PC or a notebook PC, which may be the RUI server 600, or may be a digital television (TV) displaying the UI event.

After receiving the UI data 100 from the RUI server 600, the RUI client 400 parses the URI and protocol information of the AV contents 150 embedded in the UI data 100, and stores the parsed URI and protocol information in the cache unit 200. Later, when requested by the AV CP 500, the cache unit 200 provides the stored protocol information. The cache unit 200 may include a separate local storage region (not shown), and the protocol information may be stored in the cache unit 200 in the form of a mapping table, which will now be described with reference to FIG. 6.

Figure 6:
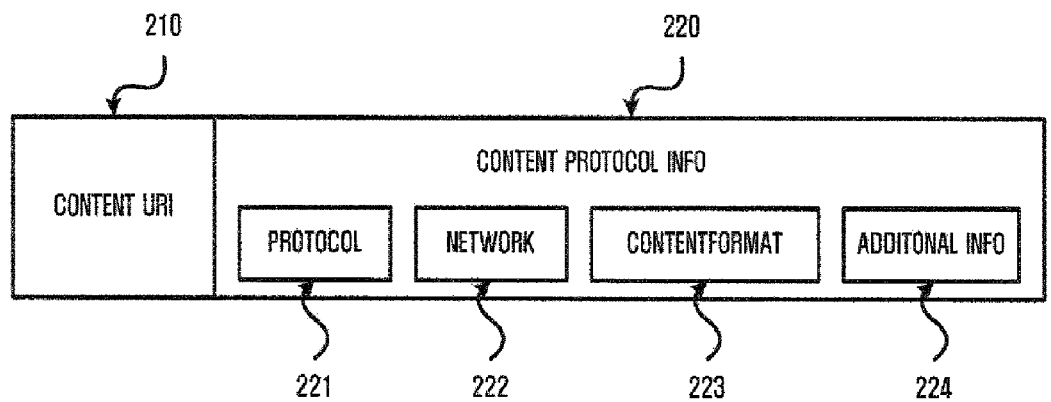
FIG. 6 illustrates a structure of a cache unit which stores protocol information according to an exemplary embodiment of the present invention.

FIG. 6 illustrates a structure of a cache unit which stores protocol information according to an exemplary embodiment of the present invention. The cache unit 200 stores data in the form of a mapping table, and the data is composed of content URI 210 and content protocol information 220. The content protocol information 220 is divided into protocol 221, network 222, contentformat 223 and additional info 224, and stored accordingly. For example, protocol information expressed as "http-get:*:application/x-dtcp1; CONTENTFORMAT=video/MP2T:*" is divided into protocol, network, format and additional info, and stored accordingly.

Referring back to FIG. 5, the RUI client 400 may have one or more profile lists in a tag (e.g., <rui:uiClientInfo> that represents information regarding the RUI client 400. Each of the profile lists may be composed of profile information of ui, audio and video. In particular, the profile information of the video may specify profile name, aspect ratio, and transport. The transport may be represented by a series of space separated values. Therefore, a transport may be selected from one or more transports and used accordingly, and such selection is performed by the AV CP 500, when the AV contents are controlled.

A user may input a control command for, for example, reproducing or recording the AV contents included in the UI data 100 to the RUI client 400. After receiving the control command from the user, the RUI client 400 extracts protocol information corresponding to the AV contents from the cache unit 200. The extracted protocol information is transmitted to the AV CP 500, together with the control command.

Figure 2:
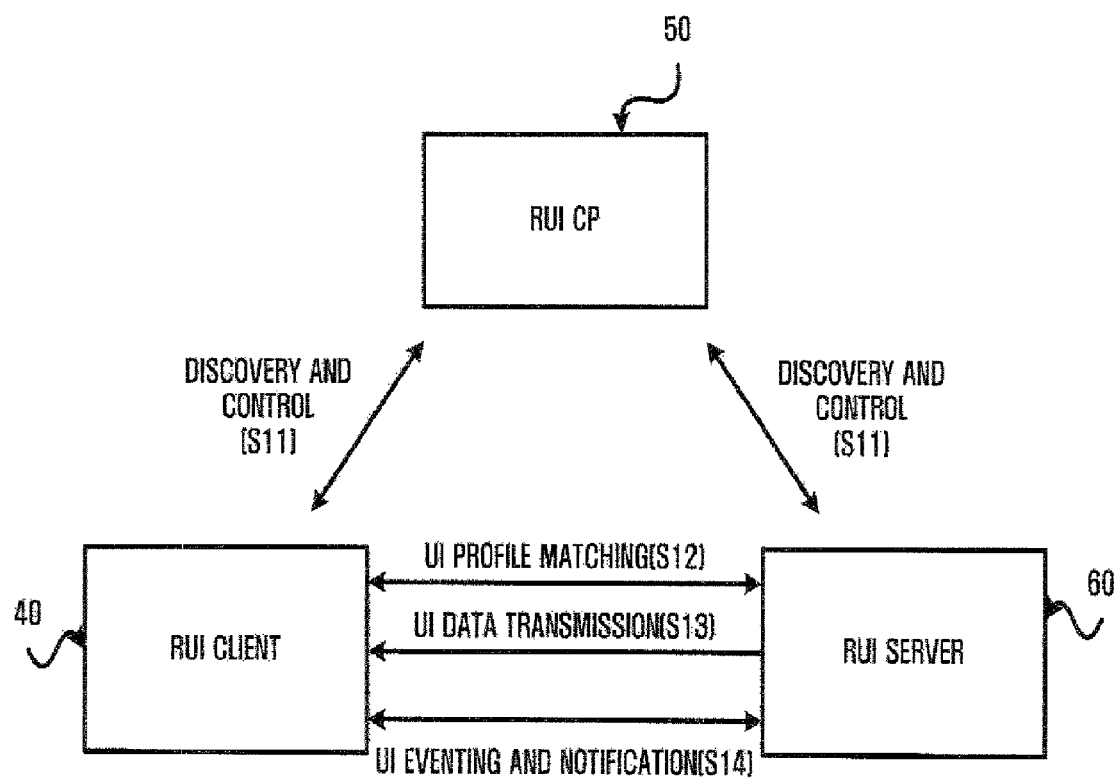
FIG. 2 illustrates a related art profile matching process between RUI devices.
Figure 3:
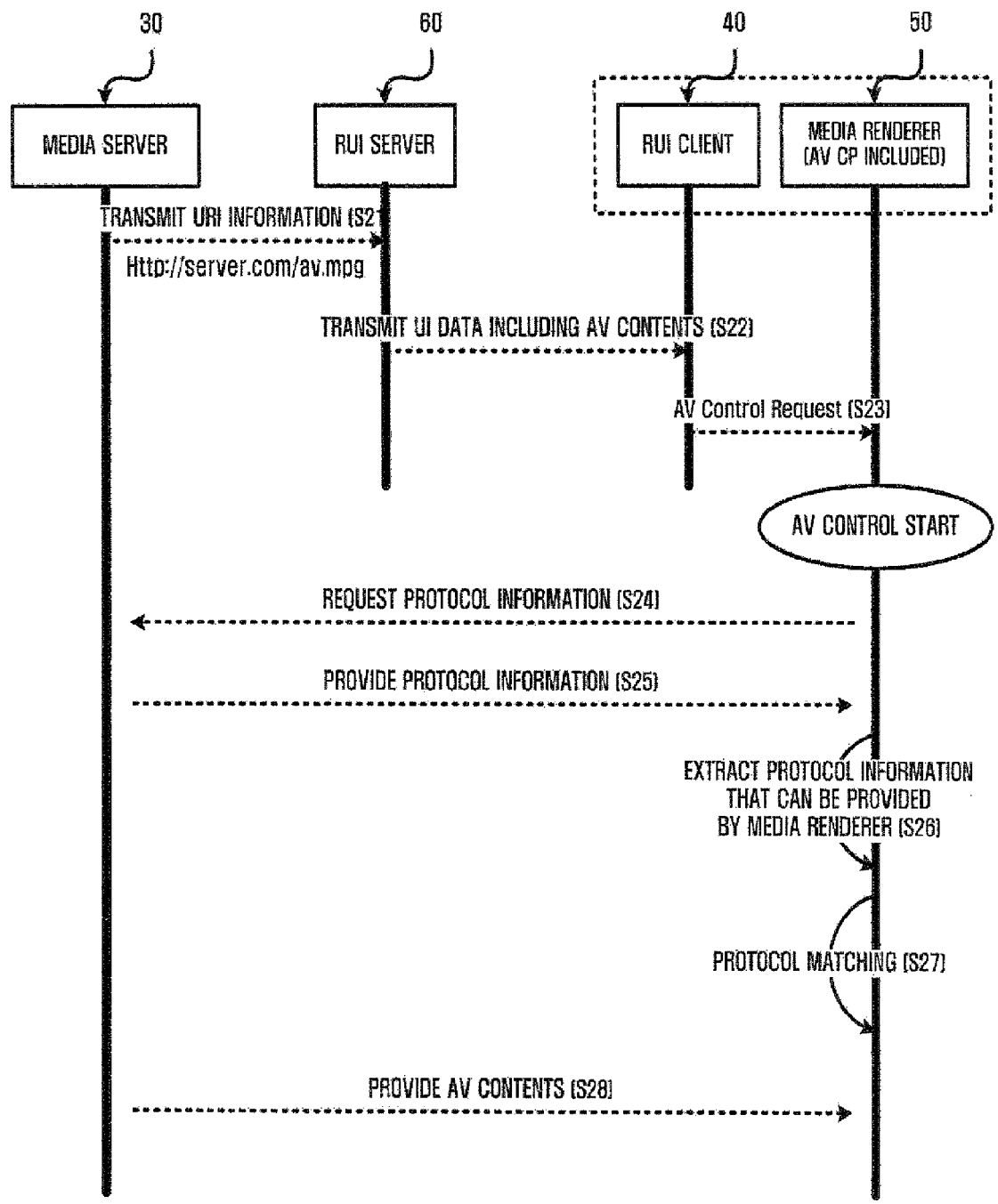
FIG. 3 illustrates a related art process of matching protocols of AV contents between RUI devices.

The AV CP 500 is a control point defined in the UPnP AV specifications. Unlike the related art RUI CP 50 illustrated in FIG. 2, the AV CP 500 controls AV contents. That is, the AV CP 500 receives the control command for the protocol information and the AV contents from the RUI client 400, and matches protocol information obtained from the media renderer 550 with the protocol information received from the RUI client 400, thereby controlling the AV contents. Based on the matching result, the AV CP 500 transmits a control message to the media renderer 550 in order to control the media renderer 550 to retrieve the AV contents from the media server 300 and reproduce or record the retrieved AV contents. After receiving the control message, the media renderer 550 may retrieve the AV contents from the media server 300. However, the media renderer 550 may also retrieve the URI information of the AV contents from the UI data 100 and control the AV contents.

The AV CP 500 and the media renderer 550 may be implemented as a single device. Alternatively, the AV CP 500 and the RUI client 400 may be implemented as a single device. The RUI client 400, the media renderer 550, and the AV CP 500 may all be implemented as a single device, or may be implemented as separate devices.

Figure 7:
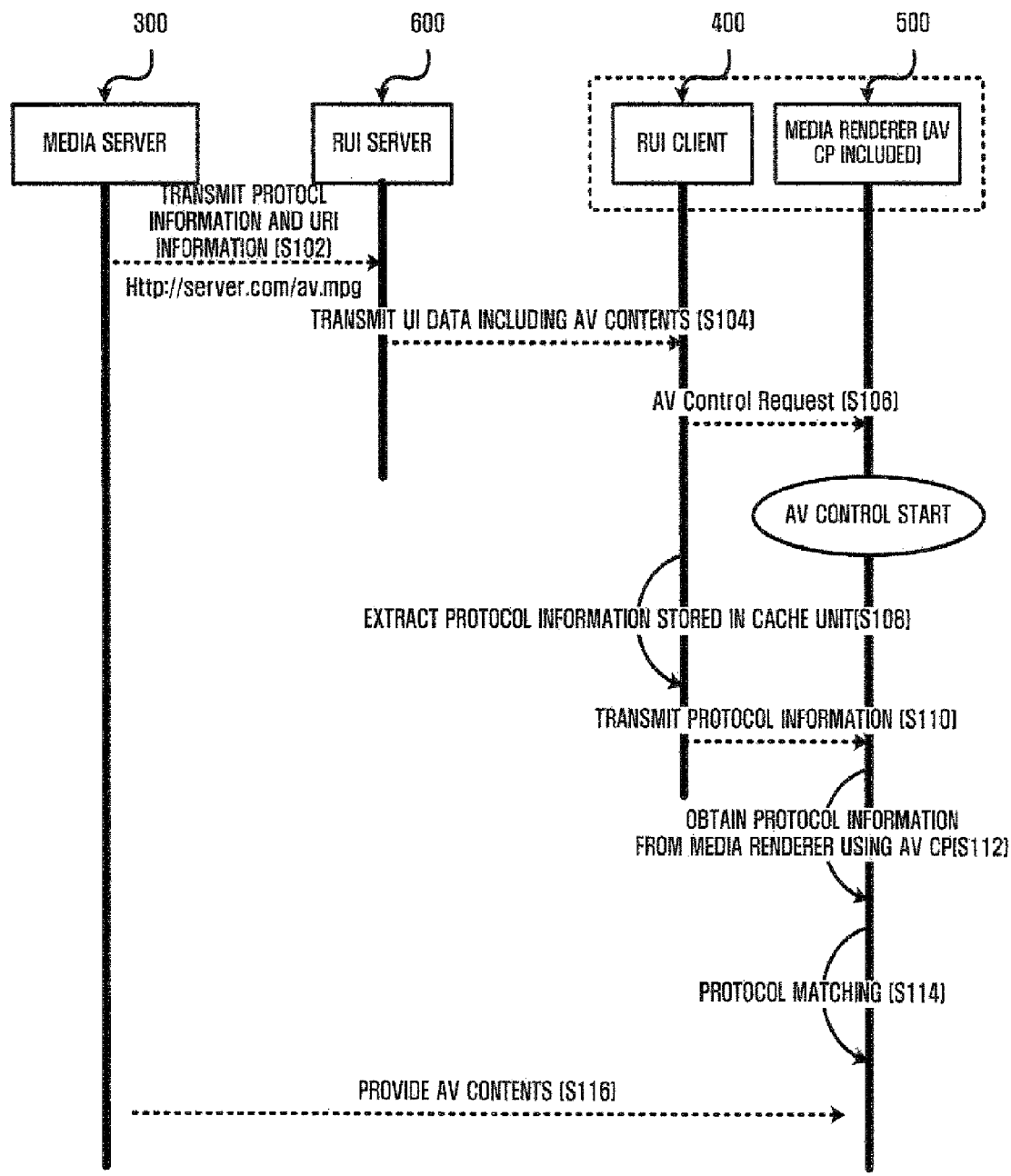
FIG. 7 is a conceptual diagram illustrating a process of matching protocols of embedded AV contents according to an exemplary embodiment of the present invention.

FIG. 7 is a conceptual diagram illustrating a process of matching protocols of embedded AV contents according to an exemplary embodiment of the present invention.

The protocol matching process according to this exemplary embodiment is a combination of a protocol matching method defined in the related art UPnP AV specifications and a profile matching process between RUI devices. When UI profile matching is performed, protocol matching is also performed, which will now be described with reference to FIG. 7.

Referring to FIG. 7, a media server 300 storing AV contents transmits URI information and protocol information of the AV contents required to create UI data to an RUI server 600 (operation S102). The URI information may be expressed as "http://server.com/av.mpg," and the protocol information may be expressed as "http-get:*:application/x-dtcp1; CONTENTFORMAT=video/MP2T:*."

The RUI server 600 creates the UI data using the received URI and protocol information, and transmits the created UI data to an RUI client 400 (operation S104). Here, embedded AV contents are also transmitted. The RUI client 400 parses the received protocol information, and stores the parsed protocol information in a cache unit 200. A method of storing the parsed protocol information in the cache unit 200 is the same as described above, and thus a detailed description thereof will be omitted.

If a user inputs a control command for executing, stopping or recording AV contents to the RUI client 400, the RUI client 400 requests an AV CP 500 to execute the control command (operation S106). Accordingly, a control operation of the AV contents is started. The RUI client 400 retrieves protocol information corresponding to the AV contents from the cache unit 200 (operation S108), and transmits the retrieved protocol information to the AV CP 500 (operation S110).

After receiving the protocol information, the AV CP 500 extracts protocol information of a media renderer in order to identify whether the media renderer is capable of rendering the AV contents (operation S112). Here, the AV CP 500 and the media renderer may be implemented as a single device or as separate devices. This extraction process may vary according to how the AV CP 500 and the media renderer are implemented.

The AV CP 500 compares the protocol information obtained from the media renderer with the protocol information received from the RUI client 400, thereby performing protocol matching (operation S114). Based on the protocol matching result, the AV CP 500 can determine whether the media renderer is capable of performing the control operation, such as rendering of the AV contents. If it is determined that the media renderer can perform a specific control operation, the AV CP 500 receives the AV contents from the media server 300 (operation S116), and transmits the received AV contents to the media renderer.

Figure 8:
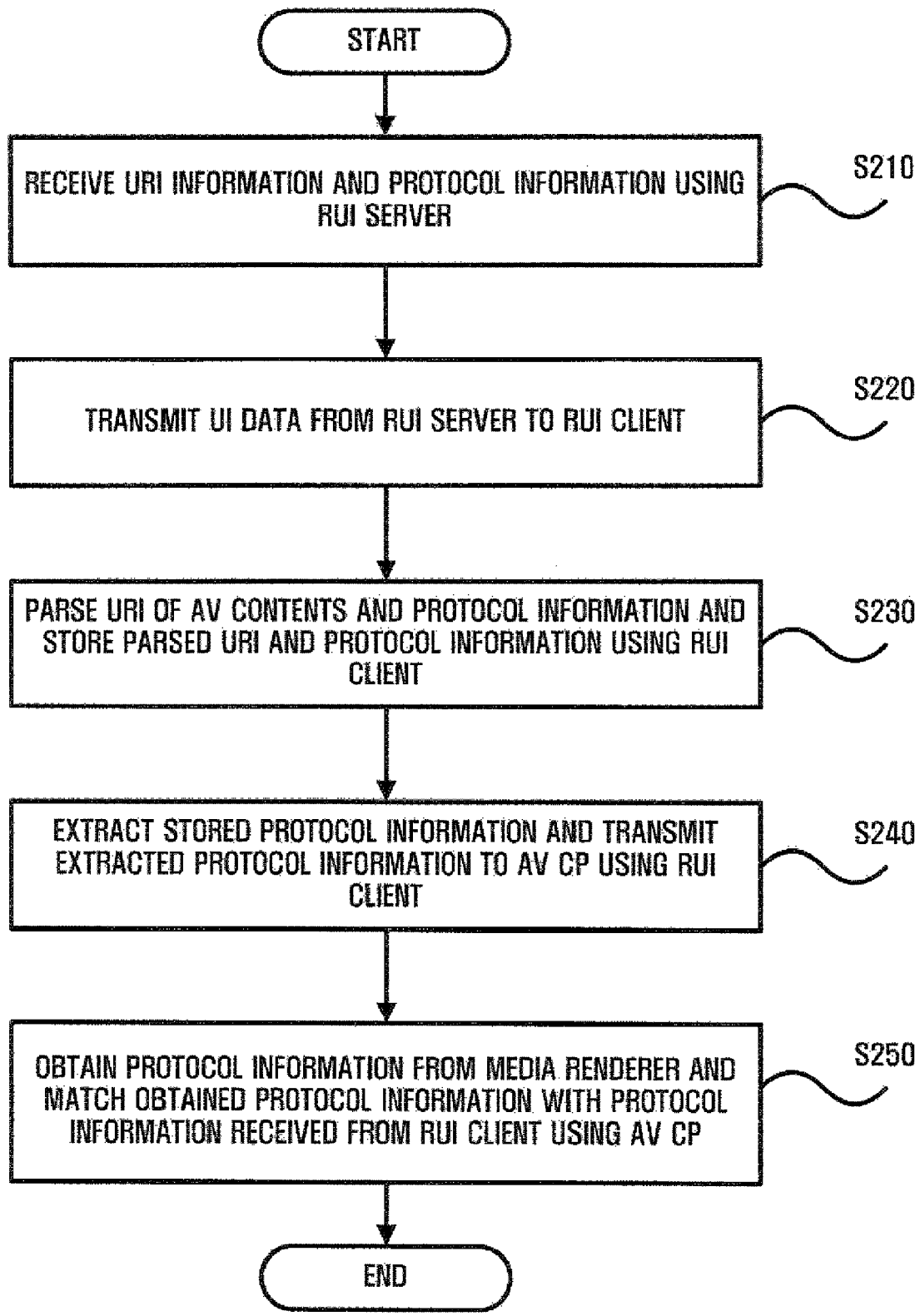
FIG. 8 is a flowchart illustrating a method of matching protocols of embedded AV contents according to an exemplary embodiment of the present invention.

FIG. 8 is a flowchart illustrating a method of matching protocols of embedded AV contents according to an exemplary embodiment of the present invention.

Referring to FIG. 8, the RUI server 600 receives URI information and protocol information of AV contents from the separate media server 300 (operation S210). The RUI server 600 creates UI data using the received URI and protocol information, and transmits the created UI data to the RUI client 400 (operation S220).

Then, the RUI client 400 parses the URI and protocol information of the AV contents from the received UI data, and stores them in the cache unit 200 (operation S230). Here, the cache unit 200 may divide the protocol information into protocol, network, format and additional info, and store them in the form of a mapping table.

The RUI client 400 receives a control command for the AV contents from a user. After receiving the control command, the RUI client 400 extracts protocol information corresponding to the AV contents from the cache unit 200, and transmits the control command and the extracted protocol information to the AV CP 500 (operation S240).

The AV CP 500 obtains protocol information of the AV contents from a media renderer, and performs a protocol matching operation in which the obtained protocol information is compared with the protocol information received from the RUI client 400 (operation S250). Based on the matching result, the AV CP 500 may retrieve the AV contents from the media server 300 and reproduce the retrieved AV contents.

It is obvious to those of ordinary skill in the art that the scope of the method of matching protocols of embedded AV contents according to the present invention extends to a computer readable recording medium on which a computer program for executing the above method is recorded.

As described above, an apparatus and method according to exemplary embodiments of the present invention provides at least one of the following advantages.

RUI devices, which transmit and receive UI data based on UPnP AV architecture, do not repeatedly perform a protocol matching process for AV contents embedded in the UI data whenever the AV contents are controlled. Instead, the RUI devices extract protocol information of the AV contents in advance when a UI profile matching process is performed, and store the extracted protocol information in an RUI client. Therefore, the speed of controlling the AV contents can be increased.

Since unnecessary network traffic caused by the extraction of protocol information whenever AV contents are controlled is reduced, the overall network efficiency can be enhanced.

Furthermore, an element of an object tag is additionally defined when UI data is configured. Therefore, the present invention can be implemented without modifying UPnP AV specifications.

However, the effects of the present invention are not restricted to the one set forth herein. The above and other effects of the present invention will become more apparent to one of ordinary skill in the art to which the present invention pertains by referencing the claims.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the following claims, and all differences within the scope will be construed as being included in the present invention.

What is claimed is:

1. An system for matching protocols of embedded audio/video (AV) contents, the system comprising:
   a remote user interface (RUI) server which receives uniform resource identifier (URI) information of AV contents and protocol information of the AV contents;
   an RUI client which receives UI data from the RUI server, the UI data including the URI information and the protocol information, parses the URI information and the protocol information of the AV contents in the UI data, and stores the parsed URI information and the parsed protocol information; and
   an AV control point (CP) which receives the stored protocol information and a control request command for the AV contents from the RUI client, matches protocol information obtained from a media renderer with the stored protocol information received from the RUI client, and performs a control operation on the AV contents.

2. The system of claim 1, wherein the RUI client comprises a cache unit in which the parsed URI information and the parsed protocol information of the AV contents is stored.

3. The system of claim 1, further comprising a media server which stores the AV contents, wherein the RUI server receives the URI information and the protocol information from the media server.

4. The system of claim 1, wherein the RUI client has at least one profile list in a tag representing information regarding the RUI client, and each of the at least one profile list comprises profile information of ui, audio and video.

5. The system of claim 4, wherein the profile information of the video comprises profile name, aspect ratio and transport.

6. The system of claim 2, wherein the cache unit stores the URI information and the protocol information in a form of a mapping table, and the protocol information is divided into protocol, network, format and additional info and stored accordingly.

7. The system of claim 2, wherein the RUI client receives the control request command for the AV contents from a user, and extracts protocol information corresponding to the AV contents from the cache unit.

8. The system of claim 7, wherein the RUI client transmits the protocol information corresponding to the AV contents and the control request command to the AV CP, and the AV CP retrieves the AV contents from the media server and reproduces the AV contents based on a matching result.

9. The system of claim 1, wherein the AV CP and the media renderer are implemented as a single device.

10. The system of claim 1, wherein the AV CP and the RUI client are implemented as a single device.

11. The system of claim 3, wherein the RUI server and the media server are implemented as a single device.

12. A method of matching protocols of embedded audio/video (AV) contents, the method comprising:
   receiving, by a remote user interface (RUI) server, uniform resource identifier (URI) information of AV contents and protocol information of the AV contents;
   transmitting the UI data from the RUI server to an RUI client, the UI data including the URI information and the protocol information; and
   parsing, by the RUI client, the URI information and the protocol information of the AV contents in the UI data; and
   storing, by the URI client, the parsed URI information and the parsed protocol information in a cache.

13. The method of claim 12, further comprising:
   extracting, by the URI client, the stored protocol information;
   transmitting the extracted protocol information to an AV control point (CP); and
   obtaining, by the AV CP, protocol information of the AV contents from a media renderer and matching the protocol information obtained from the media renderer with the protocol information received from the RUI client.

14. The method of claim 12, wherein the receiving the URI information of the AC contents comprises receiving the URI information and the protocol information from a media server, which stores the AC contents.

15. The method of claim 12, wherein the RUI client has at least one profile list in a tag representing information regarding the RUI client, and each of the at least one profile list comprises profile information of ui, audio and video.

16. The method of claim 15, wherein the profile information of the video comprises profile name, aspect ratio and transport.

17. The method of claim 12, wherein the parsing the URI information and the protocol information of the AV contents comprises generating the cache and storing the parsed URI information and the parsed protocol information in the cache in a form of a mapping table, and the stored protocol information is divided into protocol, network, format and additional info.

18. The method of claim 13, wherein the extracting and transmitting the extracted protocol information comprises:
   receiving a control request command for the AV contents from a user using the RUI client;

extracting protocol information corresponding to the AV contents in response to the control request command; and transmitting the protocol information and the control request command to the AV CP.

19. The method of claim 18, wherein the obtaining and matching the protocol information of the AV contents comprises:

retrieving the AV contents from the media server; and reproducing the AV contents using the AV CP based on a matching result.

20. A non-transitory computer readable recording medium storing a computer program for executing a method of matching protocols of embedded audio/video (AV) contents, the method comprising:

receiving uniform resource identifier (URI) information of AV contents and protocol information of the AV contents using a remote user interface (RUI) server;

transmitting the UI data from the RUI server to an RUI client, the UI data including the URI information and the protocol information; and parsing, by the RUI client, the URI information and the protocol information of the AV contents in the UI data; and storing, by the URI client, the parsed URI information and the parsed protocol information in a cache.

\* \* \* \* \*